United States Patent [19]

Mizukawa

[11] Patent Number: 5,504,547
[45] Date of Patent: Apr. 2, 1996

[54] CAMERA PROVIDED WITH BINOCULAR STEREOSCOPIC FINDER

[75] Inventor: Shigeo Mizukawa, Omiya, Japan

[73] Assignee: Fuji Photo Optical Co., Ltd., Omiya, Japan

[21] Appl. No.: 313,362

[22] Filed: Sep. 27, 1994

[30] Foreign Application Priority Data

Oct. 15, 1993 [JP] Japan .................................. 5-281639
Oct. 15, 1993 [JP] Japan .................................. 5-281640

[51] Int. Cl.⁶ .................................................. G03G 35/08
[52] U.S. Cl. .................... 354/114; 354/195.13; 354/199; 354/222
[58] Field of Search ............................ 354/112, 114, 354/115, 221, 294, 222, 199, 195.13

[56] References Cited

U.S. PATENT DOCUMENTS 2,032,676  6/1931  Warmisham .
2,453,075  11/1945  Land et al. .
4,576,458  3/1986  Cho et al. ............................... 354/199

*Primary Examiner*—Michael L. Gellner
*Assistant Examiner*—Matthew Miller
*Attorney, Agent, or Firm*—Ronald R. Snider

[57] ABSTRACT

A camera provided with a binocular stereoscopic finder which stereoscopically displays the relationship between a subject and the focal range. The binocular stereoscopic finder is provided with a pair of foreground reticles with a pair of foreground marking members for indicating the position of the near distance of the depth of field attached thereto and a pair of background reticles a pair of background marking members for indicating the far distance of the depth of field attached thereto. Each pair of reticles are moved in the horizontal direction in accordance with a preset stop value or a preset object distance. Since the depth of field is stereoscopically displayed in the finder by a foreground mark and a background mark, it is possible to judge the focal range in a three-dimensional image. The present invention is also applicable to a fixed focus and fixed stop camera.

9 Claims, 8 Drawing Sheets

CAMERA PROVIDED WITH BINOCULAR STEREOSCOPIC FINDER

BACKGROUND OF THE INVENTION

This application claims the priority of Japanese Patent Application Nos. 5-281639 and 5-281640 filed on Oct. 15, 1993, which are incorporated herein for reference.

1. Field of the Invention

The present invention relates to a camera provided with a binocular stereoscopic finder and, more particularly, to the structure of a finder for stereoscopically representing the focus information as the depth of field.

2. Description of the Related Art

A camera is provided with a finder for determining the composition of a subject and for framing. In the finder of a single-lens reflex camera, the real image obtained through the photographing lens is introduced to the eye piece where the actual image-forming state is observed. In contrast, in a compact camera or the like, a subject is caught by an optical system different from the photographing lens, and the image introduced to the eye piece is observed through this optical system.

In the finder of such a compact camera, that is, the finder for observing a subject through an optical system different from the photographing lens, it is impossible to judge whether or not the subject is in focus under observation through the finder unlike in a single-lens reflex camera having a TTL (Through The Lens) system. The compact camera generally adopts an autofocusing system, and only a mark or the like used for automatically bringing a subject into focus is displayed in the finder. In this type of camera, however, if it is possible to confirm the focused state by visually observing the subject in the finder, it will become more convenient and it will be possible to provide a new type of camera.

SUMMARY OF THE INVENTION

Accordingly, it is an object of the present invention to eliminate the above-described problem in the prior art and to provide a camera provided with a binocular stereoscopic finder in which it is possible to stereoscopically judge the relationship between a subject and the focal range.

To achieve this aim, in a first aspect of the present invention, there is provided a camera provided with a binocular stereoscopic finder, the camera comprising: the binocular stereoscopic finder; a pair of reticles disposed in the binocular stereoscopic finder with a pair of foreground marking members and a pair of background marking members for indicating the depth of field attached thereto; the pair of foreground marking members and the pair of background marking members placing marks which stereoscopically indicate the depth of field at the corresponding positions in the direction of the optical axis in the visual field space of the binocular stereoscopic finder.

In a second aspect of the present invention, there is provided a camera provided with a binocular stereoscopic finder, the camera comprising: the binocular stereoscopic finder; a horizontal pair of foreground reticles disposed in the binocular stereoscopic finder with a pair of foreground marking members for indicating the near distance of the depth of field attached thereto; a horizontal pair of background disposed in the binocular stereoscopic finder with a pair of background marking members for indicating the far distance of the depth of field attached thereto; and a driving mechanism for driving the foreground and background reticles respectively in the horizontal direction in accordance with a preset stop value.

The driving mechanism preferably drives the foreground and background reticles respectively in the horizontal direction in accordance with the focal length information and the preset stop value.

As the foreground and background reticles, two reticles are disposed in parallel with each other in the horizontal direction. Each reticle is divided into lower half portion and the upper half portion, one being used as the background reticle and the other as the foreground reticle. Alternatively, two reticles arranged in parallel with each other in the direction of the optical axis may be prepared, and one is used as the background reticle and the other as the foreground reticle.

In the present invention, attention is payed to a binocular stereoscopic finder, and the depth of field (which is also the depth of focus) in which the subject is in focus is displayed in the visual field space in the direction of the depth. For example, in an upper pair of foreground reticles and a lower pair of background reticles, the upper half part of a frame-shaped mark member which is used to indicate the distant position of the depth of field is attached to each of the background reticles, while the lower half part of a frame-shaped mark member which is used to indicate the near position of the depth of field is attached to each of the foreground reticles. The background reticles are disposed on the inside of the respective optical axes by the distance corresponding to the far distance of the depth of field, and the foreground reticles are disposed on the inside of the respective optical axes by the distance corresponding to the near distance of the depth of field.

These marking members attached to the reticles are synthesized with the eyes of a photographer, so that marks are displayed as visible images at the near distance and the far distance of the depth of field in the direction of the depth of the visual field space. It is therefore possible to confirm the focal range in the three-dimensional subject due to these marks.

The driving mechanism may be composed of a cam which rotates together with the rotation of a distance setting ring for setting the object distance, a pair of driving levers which rock in accordance with the rotation of the cam so as to drive the reticles, and a crossbar which moves the cam together with the rotation of a stop ring for setting the stop value and changes the amount of movement of the reticles in accordance with the preset stop value.

Alternatively, the driving mechanism may be composed of a position detector for detecting the position of a distance setting ring for setting the object distance, a position detector for detecting the position of a stop ring for setting the stop value, and a motor for driving the reticles in accordance with the output of these position detectors.

In a camera in which the focus is fixed (cannot be selected), each reticle is driven only in accordance with the preset stop value. In a camera in which the focus and the stop value are fixed, foreground marking members and background marking members which show the depth of field are attached to the reticles fixed in the binocular stereoscopic finder. In this case, the depth of field is determined by the focus and the stop value fixed by the camera.

The above and other objects, features and advantages of the present invention will become clear from the following description of the preferred embodiments thereof, taken in conjunction with the accompanying drawings.

DESCRIPTION OF THE PREFERRED EMBODIMENTS

First Embodiment

Figure 1:
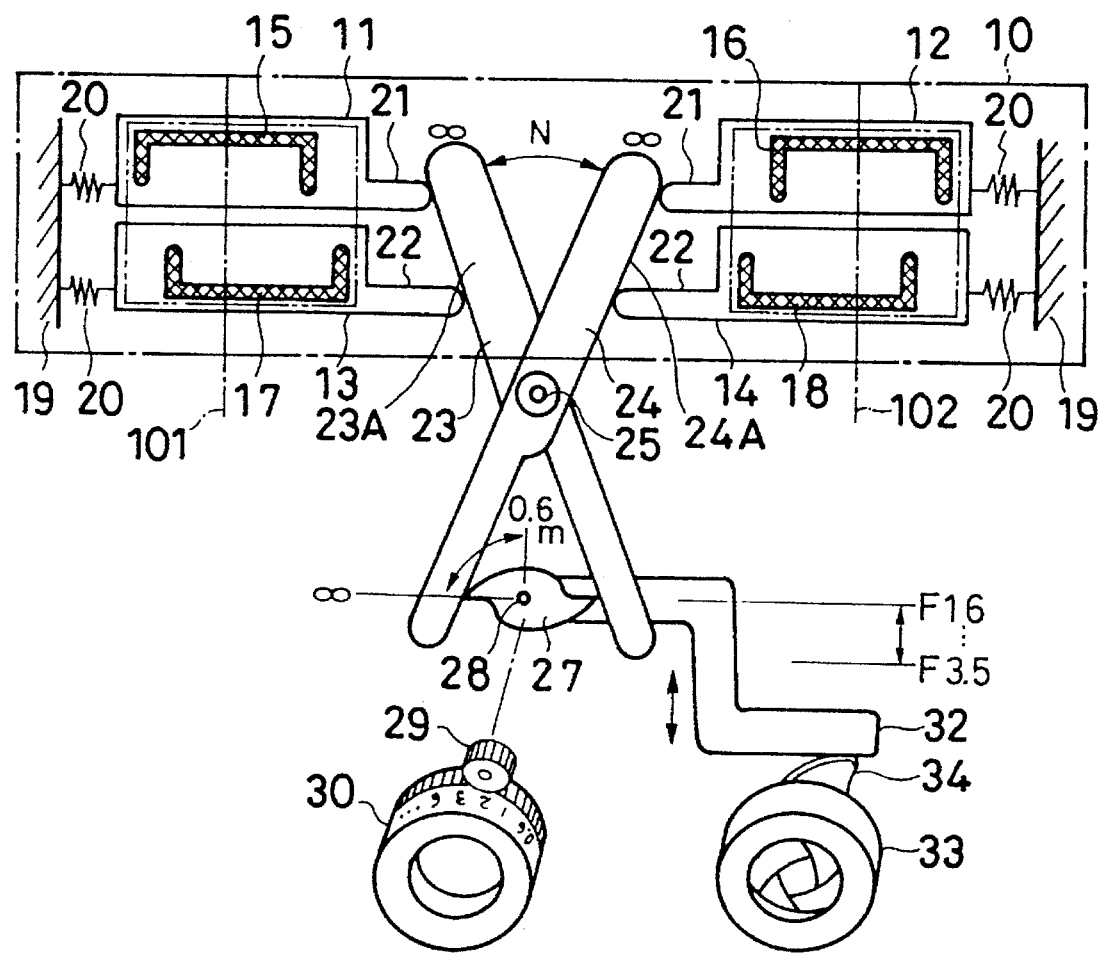
FIG. 1 shows the main structure of a first embodiment of a camera provided with a binocular stereoscopic finder according to the present invention.
Figure 2A:
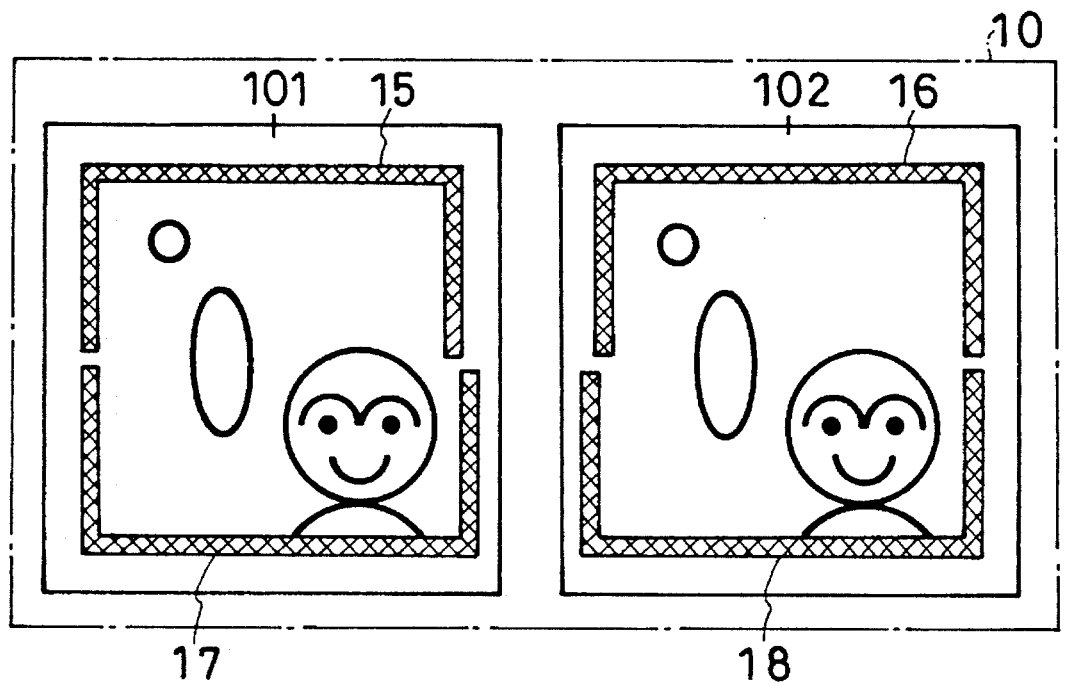
FIGS. 2(A) and 2(B) show the finder in FIG. 1 viewed with the right and left eyes through the right and left lenses, respectively.
Figure 2B:
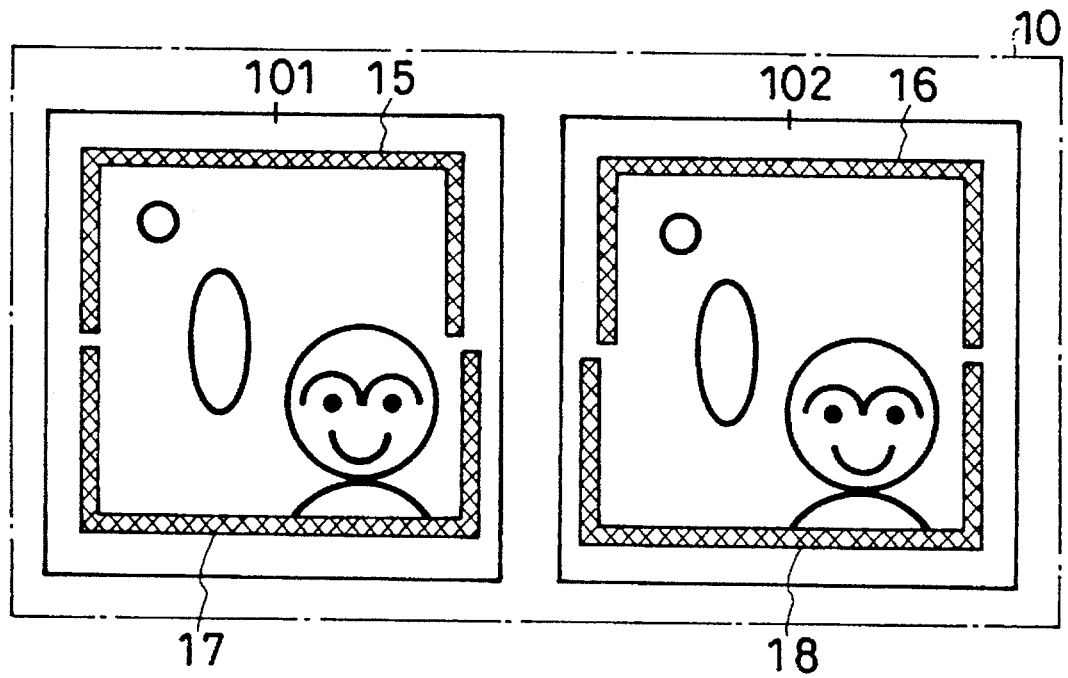

FIG. 1 shows the main structure (viewed in the direction of the front surface) of a first embodiment of a camera provided with a binocular stereoscopic finder according to the present invention, and FIGS. 2(A) and 2(B) show the binocular stereoscopic finder shown in FIG. 1 viewed with the right and left eyes through the right and left lenses, respectively. In FIG. 1, the right and left optical systems in a binocular stereoscopic finder 10 are provided with background reticles 11, 12 on the upper side and foreground reticles 13, 14 on the lower side. These right and left reticles 11 to 14 are disposed between the eye pieces (not shown) and the forward lenses (not shown) on the respective sides. The optical axes of the right and left optical systems are positioned at the broken lines 101 and 102, respectively. As shown in FIG. 2, the upper half part of frame-shaped marking members 15, 16 are attached to the background reticles 11 and 12, respectively, and the lower half part of frame-shaped marking members 17, 18 are attached to the foreground reticles 13 and 14, respectively. On the outside of the reticles 11 to 14, a spring 20 is inserted between each of the reticles 11 to 14 and a supporting portion of the binocular stereoscopic finder 10 so as to bias the reticles 11 to 14 inward.

On the other ends of the reticles 11 to 14 are provided projecting pieces 21 and 22 having different lengths. Two driving levers 23, 24 with the upper ends in contact with the projecting pieces 21 and 22 are rockable around a shaft 25. A cam 27 is disposed between the lower ends of the driving levers 23 and 24. The outer periphery of the cam 27 has a shape which rocks the driving levers 23, 24 by a predetermined amount in accordance with the rotation of the cam 27. A distance setting ring 30 is connected to the shaft 28 of the cam 27 through a gear 29 (over-drive gear). By the rotation of the distance setting ring 30, the driving levers 23, 24 are driven through the cam 27 and, as a result, the reticles 11 to 14 are moved in the horizontal direction.

As shown in FIG. 1, the cam 27 has a minimum radius which corresponds to the focal length of 0.6 m and a maximum radius which corresponds to the infinite focal length (far distance). In FIG. 1 (FIG. 2(A)), the camera is focused on a far distance. In this state, the centers of the background reticles 11 and 12 are positioned on the optical axes 101 and 102, respectively, and the centers of the foreground reticles 13 and 14 are positioned on the inside of the optical axes 101 and 102. (In FIG. 1, the amount of movement of each of the foreground reticles 13 and 14 is magnified for the convenience of explanation.) The background reticles 11, 12 form a mark (image) at the far distance of the depth of field, and the foreground reticles 13, 14 form a mark (image) at the near distance of the depth of field. This structure utilizes the phenomenon that when the marking members 15 and 16 are disposed with a space corresponding to the distance of the optical axes of the binocular lenses therebetween, the space between the binocular lenses corresponding to the distance between human eyes, the visual mark image stereoscopically synthesized with both eyes is seen at a far distance and when marking members are slid inward from the optical axes as the marking members 17, 18, the visual mark image synthesized is moved toward a near distance.

According to this structure, in correspondence with the phenomenon that the farther the subject which is to be brought into focus, the deeper the depth of field, the amount of movement of the background reticles 11, 12 caused by the rocking of the driving levers 23, 24 is set to be larger than that of the foreground reticles 13, 14.

In addition, as shown in FIG. 1, it is possible to move the cam 27 in the vertical direction by a crossbar 32. A projection 34 which is rotated with the rotation of a stop ring 33 is in contact with the crossbar 32. The projection 34 has a shape which vertically moves the crossbar 32 in accordance with the rotation of the ring 33. For example, as the stop gradually changes from F= 3.5 to F=16 (as the aperture of the stop becomes smaller), the crossbar 32 is raised, so that the driving levers 23, 24 are rocked at a large amplitude. As a result, the range represented by the marking members 15 to 18 becomes larger, which corresponds to the phenomenon that the smaller the aperture of the stop, the deeper the depth of field. The outer peripheral surfaces 23A, 24A of the driving levers 23, 24 may have a curved shape which changes the amount of movement of the reticles 11 to 14 so as to enable the preset value of depth of filed adjust in accordance with the focal length and the preset stop value.

Figure 3A:
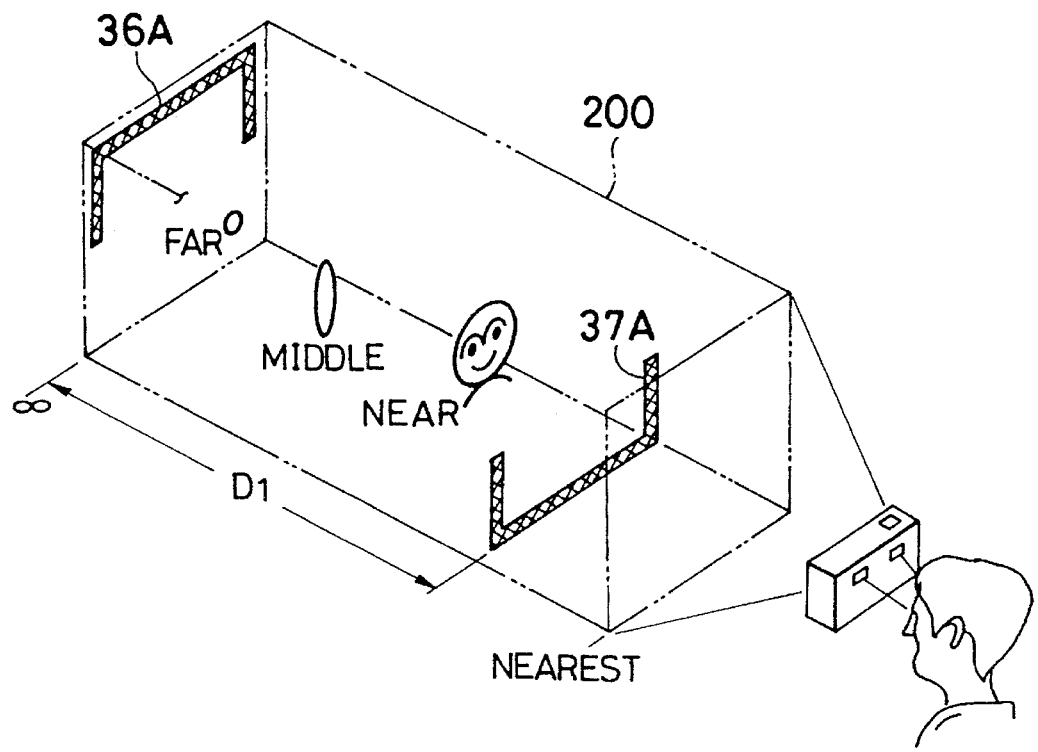
FIGS. 3(A) and 3(B) show the concept of the marks displayed in the visible field space in the binocular stereoscopic finder in the state shown in FIGS. 2(A) and 2(B), respectively.

The operation of the first embodiment will now be explained with reference to FIGS. 2(A), 2(B) and FIGS. 3(A), 3(B). FIG. 2(A) shows the finder in FIG. 1 viewed with the right and left eyes through the left and right optical systems, respectively. The marking members 15, 16 of the background reticles 11, 12 are positioned on the optical axes 101 and 102, respectively, while the marking members 17, 18 of the foreground reticles 13, 14 are positioned on the inside of the optical axes 101 and 102. The visible field space in the finder at this time is shown in FIG. 3(A). In the visible field space 200 observed by the photographer through the binocular stereoscopic finder 10, a person is positioned at a near distance, an eclipse at a middle distance and a small circle at a far distance.

In this visible field space 200, according to the above-described arrangement of the reticles 11 to 14, a mark 36A is made visible at the position of the small circle by the marking members 15, 16, and a mark 37A is made visible at a nearer position than the person at a near distance by the marking members 17, 18. Therefore, when the distance setting ring 30 is set at a far distance and the stop ring 33 is set at F=16, as shown in FIG. 1, the distance between the marks 36A and 37A is recognized as the depth D1 of field, and it is possible to confirm under stereoscopic observation through the binocular stereoscopic finder 10 that all the person, the eclipse and the small circle are in focus.

Figure 3B:
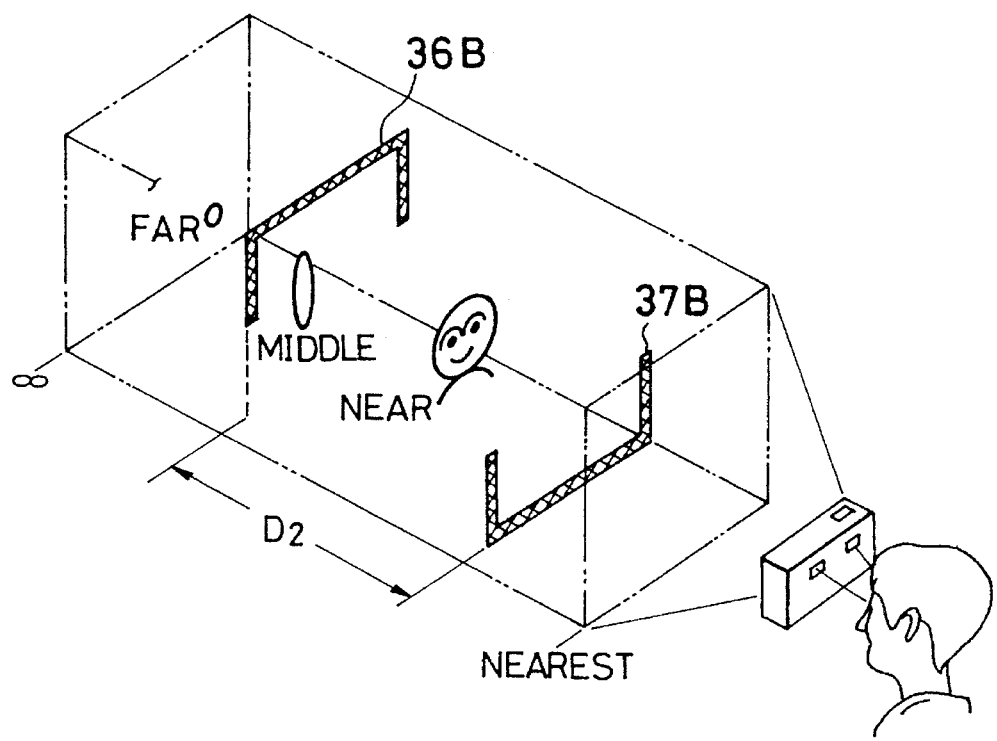

FIG. 2(B) shows the case in which the distance setting ring 30 is set at a near distance and the aperture of the stop is set at a comparatively small value. The marking members 15, 16 of the background reticles 11, 12 are positioned slightly on the inside of the optical axes 101, 102, and the marking members 17, 18 of the foreground reticles 13, 114 are positioned further on the inside of the optical axes 101, 102. The visible field space in the finder at this time is shown in FIG. 3(B). In the visible field space 200 observed by the photographer through the binocular stereoscopic finder 10, a mark 36B is made visible at a middle distance by the marking members 15, 16, and a mark 37B is made visible at a nearer position than the person at a near distance by the marking members 17, 18. In this case, the distance between the marks 36B and 37B is therefore recognized as the depth D2 of field, and it is possible to confirm under stereoscopic observation through the binocular stereoscopic finder 10 that both the person and the eclipse are in focus.

In this way, a focusing operation is facilitated without the need for autofocusing control.

Second Embodiment

Figure 4:
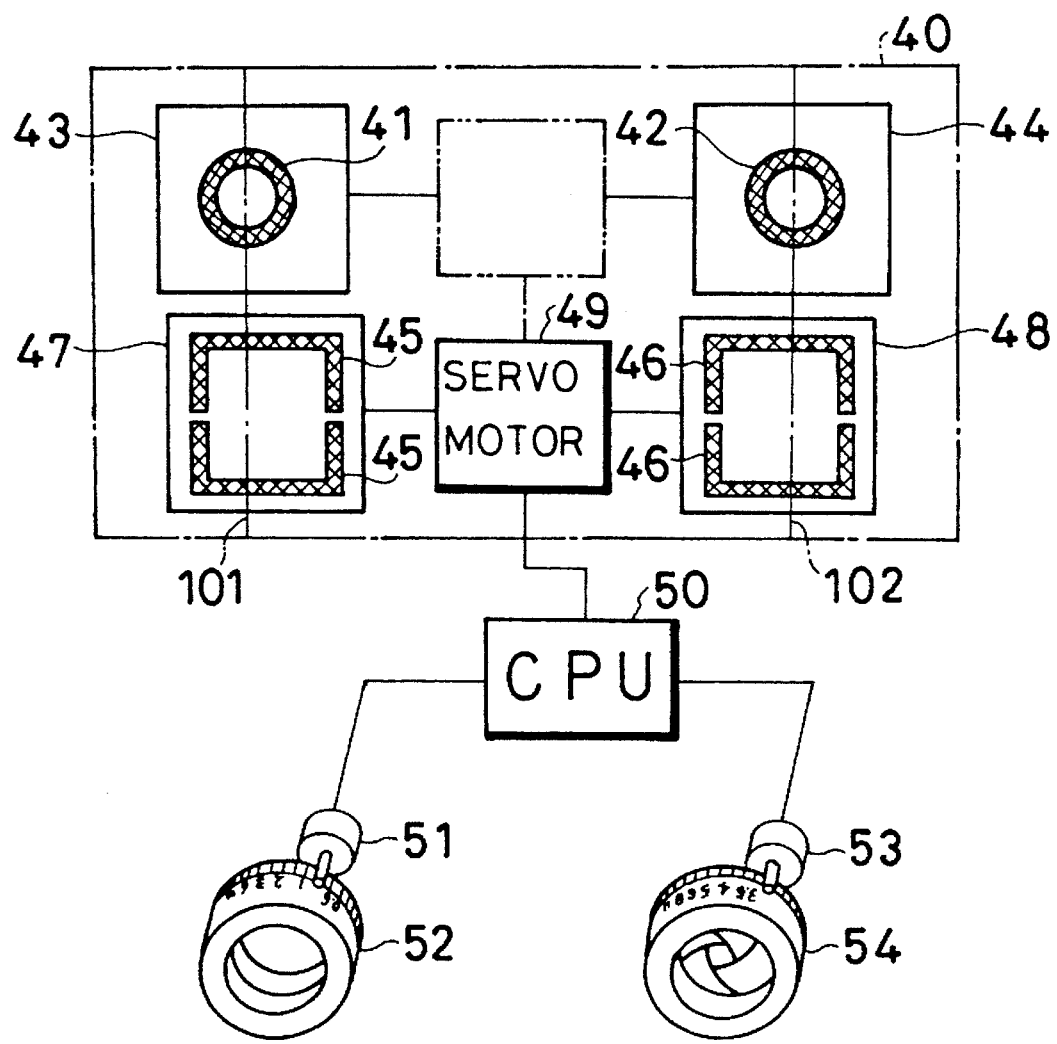
FIG. 4 shows the main structure of a second embodiment of the present invention.

FIG. 4 shows the structure of a second embodiment of the present invention, in which the reticles are electrically driven by a servo motor. In FIG. 4, a binocular stereoscopic finder 40 is provided with background reticles 43, 44 with circular marking members 41, 42 attached thereto and foreground reticles 47, 48 with frame-shaped marking members 45, 46 attached thereto. The the background reticles 43, 44 are arranged in parallel with the foreground reticles 47, 48, respectively, in the direction of the respective optical axes. A servo motor 49 for driving the reticles 43, 44, 47, 48 is provided through a mechanism (not shown) for converting the rotational motion into linear motion. A CPU 50 is connected to the servo motor 49, and the CPU 50 is connected to a distance setting ring 52 through a potentiometer 51 and to a stop ring 54 through a potentiometer 53.

According to the second embodiment, the distance data is suppled from the distance setting ring 52 to the CPU 50 through the potentiometer 51 and the preset value of the stop ring 54 is suppled to the CPU 50 through the potentiometer 53. The CPU drives the servo motor 49 in accordance with the data supplied. As a result, the background reticles 43, 44 and the foreground reticles 47, 48 are moved inside of the optical axes 101, 102 by the preset value based on the data on the focal distance and the stop value independently of each other.

Figure 5:
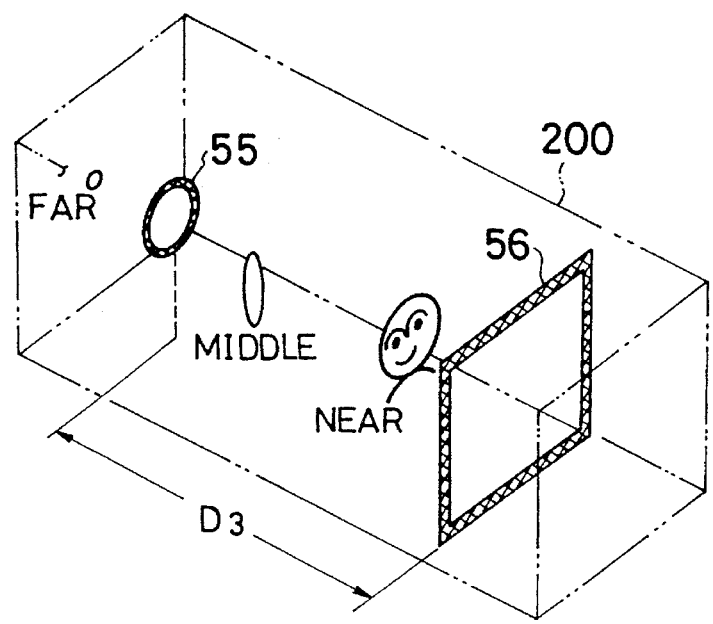
FIG. 5 shows the concept of the marks displayed in the visible field space in the binocular stereoscopic finder of the second embodiment.

The visible field space in the finder at this time is shown in FIG. 5. In the visible field space 200 observed by the photographer through the binocular stereoscopic finder 40, a circular mark 55 is made visible between an eclipse at a middle distance and a small circle at a far distance by the marking members 41, 42, and a frame-shaped mark 56 is made visible at a nearer position than the person at a near distance by the marking members 45, 46. The distance between the marks 55 and 56 is therefore recognized as the depth D3 of field. The second embodiment is advantageous in that the control over the movement of each of the reticles 43, 44, 47 and 48 is easier than in the first embodiment.

Third Embodiment

Figure 6:
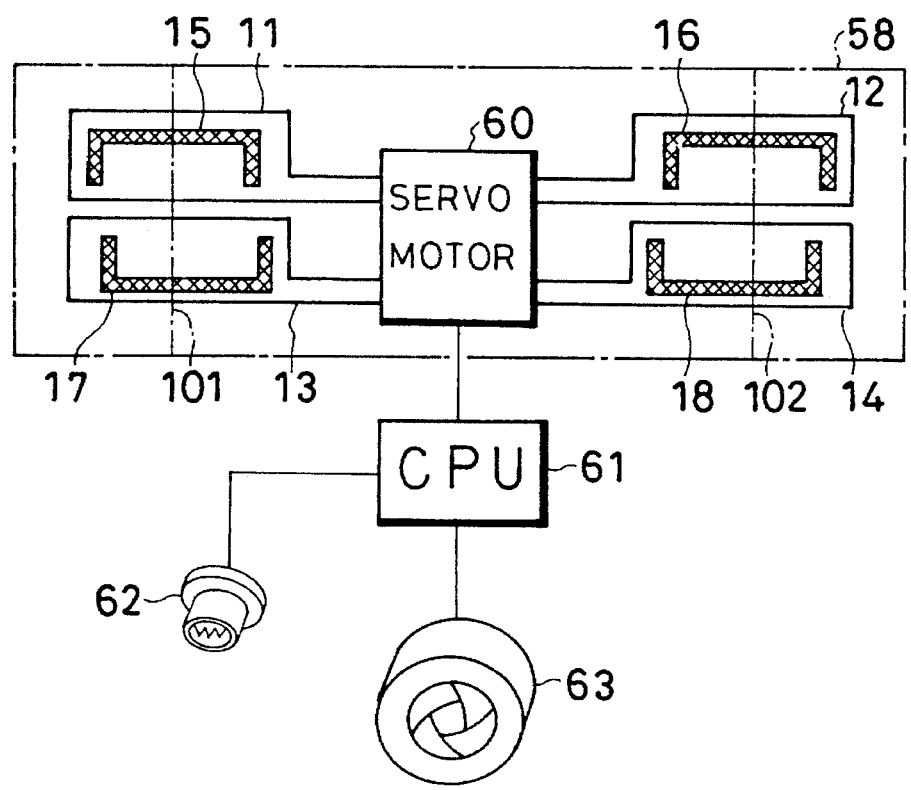
FIG. 6 shows the main structure of a third embodiment of the present invention.

FIG. 6 shows the structure of a third embodiment of the present invention, which is applied to a pan-focus camera (for example, the focal length is fixed). In FIG. 6, a binocular stereoscopic finder 50 is provided with the background reticles 11, 12 and the foreground reticles 13, 14 with the frame-shaped marking members 15 to 18 attached thereto, respectively, in the same way as in the first embodiment. These reticles 11 to 14 are connected to a servo motor 60. A CPU (central processing unit) 61 is connected to the servo motor 60, and the CPU 61 is connected to a light receiving sensor 62 for controlling the exposure and to a fixed focus lens portion 63 having a stop. The aperture of the stop of the fixed focus lens portion 63 is opened and closed under control such as aperture-priority control and the control by a program shutter.

According to the structure of the third embodiment, the brightness of a subject is detected by the light receiving sensor 62, and the stop value of the fixed focus lens portion 63 is controlled on the basis of the detected value. Simultaneously, the CPU 61 drives the servo motor 60 in accordance with the stop value. As a result, the background reticles 11, 12 and the foreground reticles 13, 14 are moved in the horizontal direction by a predetermined amount. It is therefore possible to confirm the depth of field in a three-dimensional image by the mark at the far distance and the mark at the near distance in the same way as in the first embodiment.

Although the depth of field is confirmed in the above-described manner in the first to third embodiments, a conventional autofocusing control system may also be adopted so as to confirm the autofocused state by the marks in the binocular stereoscopic finder. In addition, although the marks are moved by driving the reticles 11 to 14 in accordance with the operating conditions, it is also possible to fix each of the reticles 11 to 14 and display only the depth of field in a fixed focus and fixed stop camera. Furthermore, the frame-shaped or circular marking members 15 to 18, 41, 42, 45 and 46 in these embodiments may have another shape.

As described above, according to the first to third embodiments, it is possible to judge the focal range of a subject in a three-dimensional image by referring to the marks, in other words, focusing under observation through the finder is possible. Thus, it is possible to provide a new type of camera.

Fourth Embodiment

Figure 7:
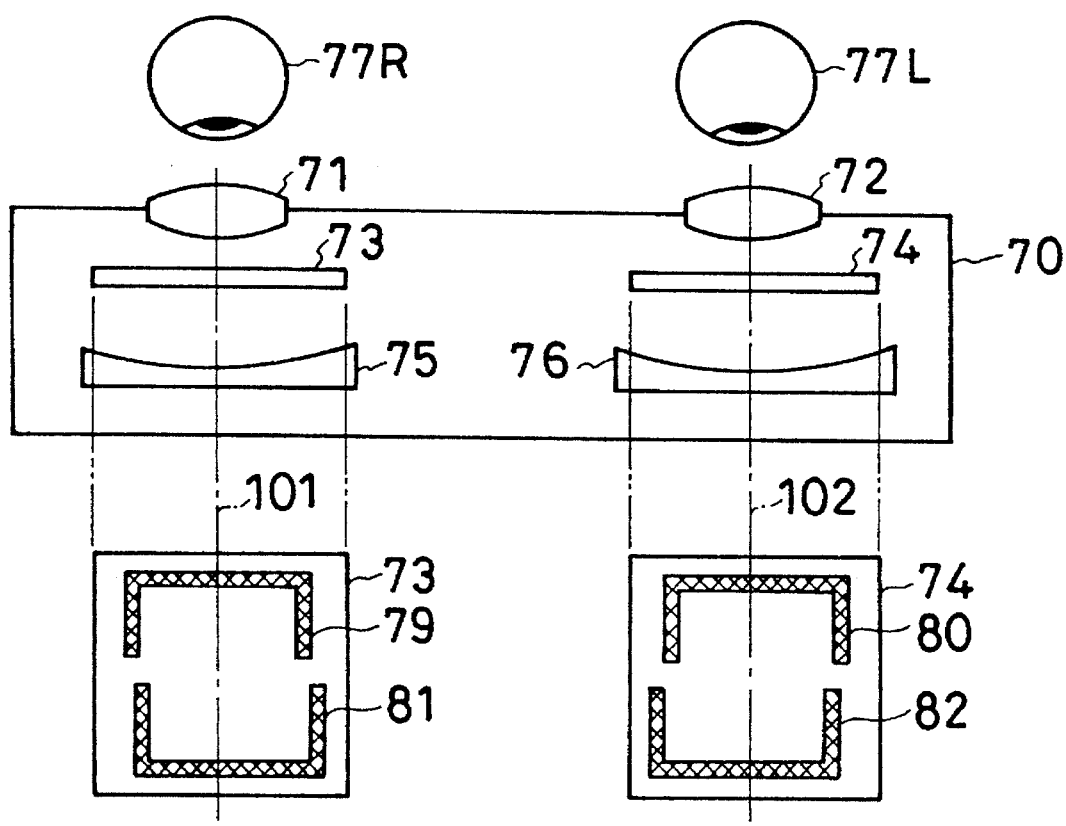
FIG. 7 shows the main structure of a fourth embodiment of a simplified camera provided with a binocular stereoscopic finder according to the present invention.
Figure 8:
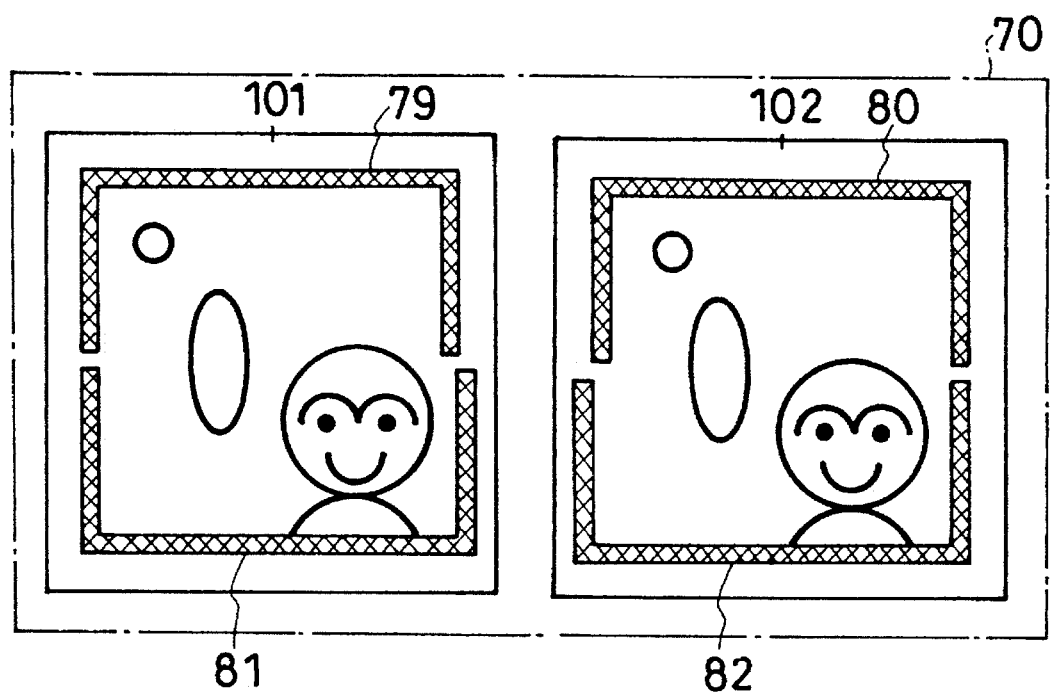
FIG. 8 show the binocular stereoscopic finder shown in FIG. 7 viewed with the right and left eyes through the right and left lenses, respectively.
Figure 9:
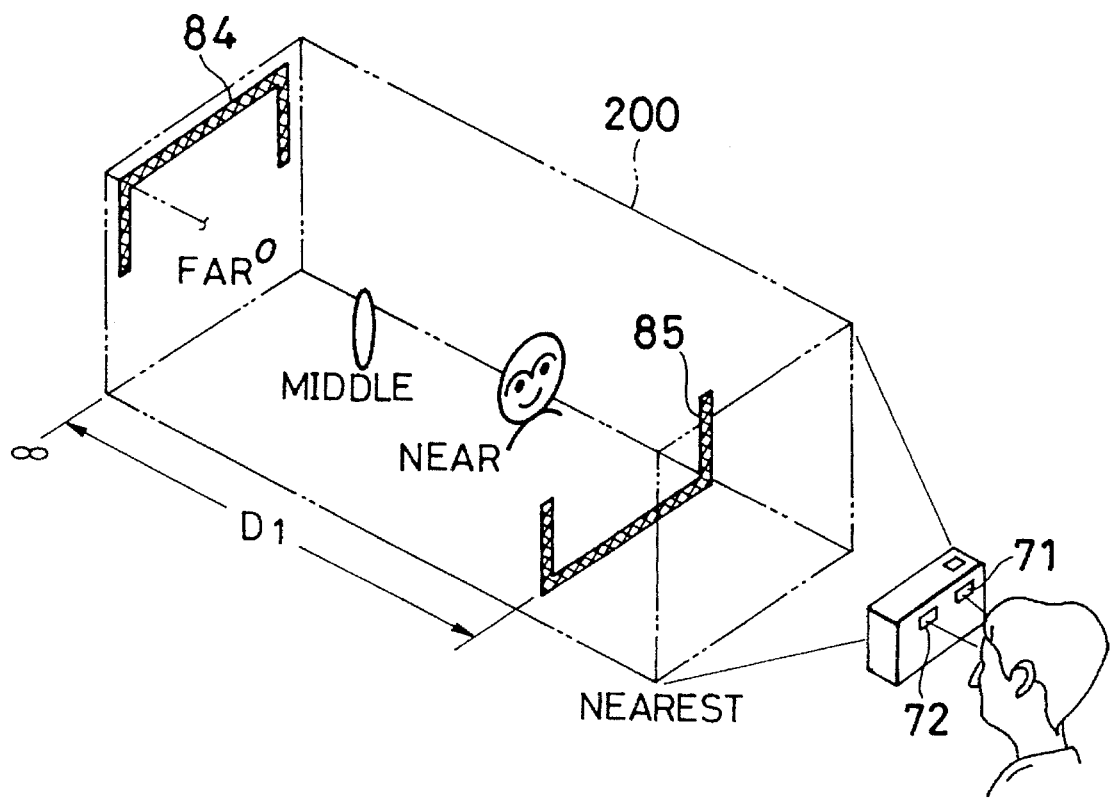
FIG. 9 shows the concept of the marks displayed in the visible field space in the binocular stereoscopic finder of the fourth embodiment.

FIG. 7 shows the structure of a fourth embodiment of a camera provided with a binocular stereoscopic finder according to the present invention. In FIG. 7, the binocular stereoscopic finder 70 is provided with eye pieces 71, 72, reticles 73, 74 and forward lenses (concave lenses) 75, 76 as the right and left optical systems. The pair of these optical systems are disposed with the space therebetween which corresponds to the distance between the right and left eyes 77L, 77R. As shown in FIG. 7, the upper half part of frame-shaped marking members 79, 80 and the lower half part of frame-shaped marking members 81, 82 are attached to the reticles 73, 74 as background marking members and foreground marking members, respectively. The background marking members 79, 80 are disposed inside of the optical axes 101, 102 by the distance corresponding to the far distance of the depth of field, but in FIG. 7, the centers of the background marking members 79, 80 are positioned on the optical axes 101, 102. The foreground marking members 81, 82 are disposed inside of the optical axes 101, 102 by the distance corresponding to the near distance of the depth of field. This arrangement is in accordance with the depth of field determined by both the fixed focus and the fixed stop of the camera. FIG. 8 shows the binocular stereoscopic finder shown in FIG. 7 viewed with the right and left eyes through the right and left lenses, respectively. The marking members 79 to 82 attached to the reticles 73, 74 are positioned around the subject. The visible field space in the finder at this time is shown in FIG. 9. As shown in FIG. 9. in the visible field space 200 observed by the photographer through the binocular stereoscopic finder 70, a person is positioned at a near distance, an eclipse at a middle distance and a small circle at a far distance. In this visible field space 200, since the background marking members 79, 80 are positioned on the optical axes 101, 102, a background mark (image) 84 is made visible at the position of the small circle at the far distance, while since the foreground marking members 81, 82 are disposed inside of the optical axes 101, 102 by the predetermined distance, a foreground mark 85 is made visible at a nearer position than the person at a near distance.

This structure utilizes the phenomenon that when the background marking embers 79 and 80 are disposed with a space corresponding to the distance of the optical axes of the binocular lenses therebetween, the space between the binocular lenses corresponding to the distance between human eyes, the visual mark image stereoscopically synthesized with both eyes is seen at a far distance and when marking members 81, 82 are slid inward from the optical axes as the marking members 81, 82, the visual mark image synthesized is moved toward a near distance. The distance between the background mark 84 and the foreground mark 85 is therefore recognized as the depth D1 of field, and it is possible to confirm under stereoscopic observation through the binocular stereoscopic finder 70 that all the person, the eclipse and the small circle are in focus.

Fifth Embodiment

Figure 10:
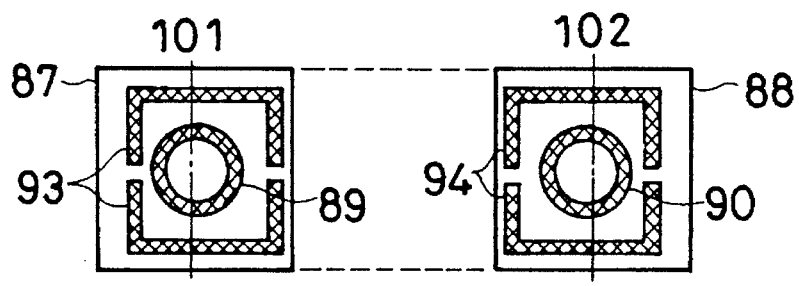
FIG. 10 shows the main structure of a fifth embodiment of the present invention.

FIG. 10 shows the structure of a fifth embodiment of the present invention. In the fifth embodiment, both a background marking member and a foreground marking member are attached to one reticle. Circular background marking members 89, 90 and frame-shaped marking members 93, 94 are attached to right and left reticles 87, 88. The background marking members 89, 90 are positioned slightly on the inside of the optical axes 101, 102 in correspondence with the depth of field of the camera, and the foreground marking members 93, 94 are positioned further on the inside of the optical axes 101, 102, as shown in FIG. 10.

The visible field space in the finder at this time is shown in FIG. 5. In the visible field space 200 observed by the photographer through the binocular stereoscopic finder, a circular mark 55 is made visible between an eclipse at a middle distance and the small circle at a far distance by the background marking members 89, 90, and a frame-shaped mark 56 is made visible at a nearer position than the person at a near distance by the foreground marking members 93, 94. The distance between the marks 55 and 56 is therefore recognized as the depth D3 of field.

As described above, in the fourth and fifth embodiments, the depth of field of a fixed focus and fixed stop camera is displayed by a background mark and a foreground mark, and it is confirmed that the subject is in focus by these marks. Since the depth of field is determined by the positions at which the respective marking members are disposed, it is set in accordance with the focus and the stop value of each camera. Since it is possible to display the depth of field in correspondence with each camera, it is possible to provide a simplified camera exclusively for near distance, middle distance or far distance. According to this structure, it is possible confirm the focused state by observing through the finder even in a disposable camera such as film attached to lenses. Thus, it is possible to provide a new type of camera.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A camera provided with a binocular stereoscopic finder, said camera comprising:

said binocular stereoscopic finder;

a horizontal pair of reticles disposed in said binocular stereoscopic finder with a pair of foreground marking members and a pair of background marking members for indicating the depth of field attached thereto;

said pair of foreground marking members and said pair of background marking members placing marks which stereoscopically indicate said depth of field at the corresponding positions in the direction of the optical axis in the visual field space of said binocular stereoscopic finder.

2. A camera provided with a binocular stereoscopic finder according to claim 1, wherein said horizontal pair of reticles are divided into two horizontal pairs of reticles, one pair serving as foreground reticles with said pair of foreground marking members for indicating the near distance of said depth of field attached thereto, the other pair serving as background reticles with said pair of background marking members for indicating the far distance of said depth of field attached thereto;

further comprising a driving mechanism for driving said foreground and background reticles respectively in the horizontal direction in accordance with a preset stop value.

3. A camera provided with a binocular stereoscopic finder according to claim 2, wherein said driving mechanism drives said foreground and background reticles respectively in the horizontal direction in accordance with a preset stop value and the focal length information.

4. A camera provided with a binocular stereoscopic finder according to claim 2, wherein said horizontal pair of reticles are vertically divided into two horizontal pairs of reticles.

5. A camera provided with a binocular stereoscopic finder according to claim 2, wherein said horizontal pair of foreground are arranged in parallel with said horizontal pairs of background reticles, respectively, in the direction of the respective optical axes.

6. A camera provided with a binocular stereoscopic finder according to claim 2, wherein said binocular stereoscopic finder is applied to a fixed focus camera, and said pairs of reticles are driven only in accordance with said preset stop value.

7. A camera provided with a binocular stereoscopic finder according to claim 3, wherein said driving mechanism includes: a cam which rotates together with the rotation of a distance setting ring for setting the object distance; a pair of driving levers which rock in accordance with the rotation of said cam so as to drive said reticles; and a crossbar which moves said cam together with the rotation of a stop ring for setting said stop value and changes the amount of movement of said reticles in accordance with said preset stop value.

8. A camera provided with a binocular stereoscopic finder according to claim 3, wherein said driving mechanism includes: a position detector for detecting the position of a distance setting ring for setting the object distance; a position detector for detecting the position of a stop ring for setting said stop value; and a motor for driving said reticles in accordance with the output of said position detectors.

9. A camera provided with a binocular stereoscopic finder in which the focus and the stop value are fixed, said camera comprising: said binocular stereoscopic finder; a horizontal pair of reticles fixed in said binocular stereoscopic finder with a pair of foreground marking members and a pair of background marking members for indicating the depth of field attached thereto;

said pair of foreground marking members and said pair of background marking members placing marks which stereoscopically indicate said depth of field at the corresponding positions in the direction of the optical axis in the visual field space of said binocular stereoscopic finder.

* * * * *